United States Patent
Harper

(10) Patent No.: US 6,783,162 B1
(45) Date of Patent: Aug. 31, 2004

(54) KENNEL DOOR LATCH

(75) Inventor: Mike Harper, Forth Worth, TX (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 94 days.

(21) Appl. No.: 10/294,730

(22) Filed: Nov. 15, 2002

(51) Int. Cl.$^7$ ................................................ B05C 1/06
(52) U.S. Cl. ...................................... 292/40; 292/336.3
(58) Field of Search ............................ 292/32, 34, 35, 292/36, 40, 41, 158, 166–168, 139, 336.3, DIG. 31

(56) References Cited

U.S. PATENT DOCUMENTS

| | | | | |
|---|---|---|---|---|
| 243,374 A | * | 6/1881 | Howard | |
| 844,456 A | * | 2/1907 | Mendel | |
| 2,486,586 A | * | 11/1949 | Brittain | 292/1 |
| 2,772,809 A | * | 12/1956 | Ross | 220/55 |
| 4,370,874 A | * | 2/1983 | Munn | 70/204 |
| 4,384,656 A | * | 5/1983 | McQuiston et al. | 220/323 |
| 4,930,819 A | * | 6/1990 | Sharp et al. | |
| 5,016,926 A | * | 5/1991 | Sharp et al. | |
| 5,033,696 A | * | 7/1991 | Horstman | 244/129 |
| 5,035,321 A | * | 7/1991 | Denton | 206/225 |
| 5,071,176 A | * | 12/1991 | Smith | |
| 5,462,015 A | * | 10/1995 | Murphy | |
| 5,499,850 A | * | 3/1996 | Sharp | |

* cited by examiner

Primary Examiner—Gary Estremsky
(74) Attorney, Agent, or Firm—Locke Liddell & Sapp LLP

(57) ABSTRACT

A latch for a door, the door being movable between an open position and a closed position with the latch securing the door in the closed position. The latch includes a base plate that is mounted to the door. The latch further includes a housing secured to the base plate and a rotating member disposed between the housing and the base plate. A knob is pivotably mounted to the rotating member and extends through the housing. The knob is operable between a folded position and an extended position. When in the knob is in folded position, the knob is received within a recessed area of the housing and is restricted from movement. When the knob is in the extended position, the knob is extended from the recessed area and operable to rotate the rotating member to slide a bolt between the bolt extended position, where the door is locked, and a bolt retracted position, where the door is unlocked and can freely move.

8 Claims, 4 Drawing Sheets

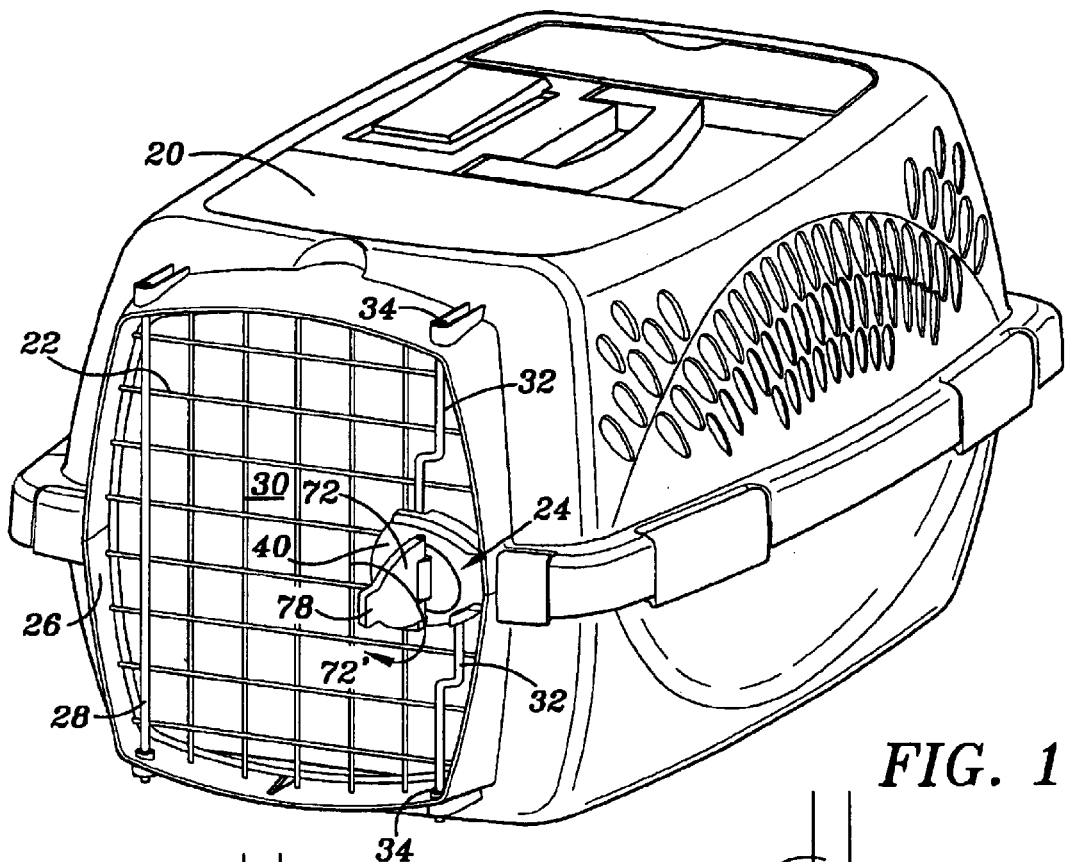
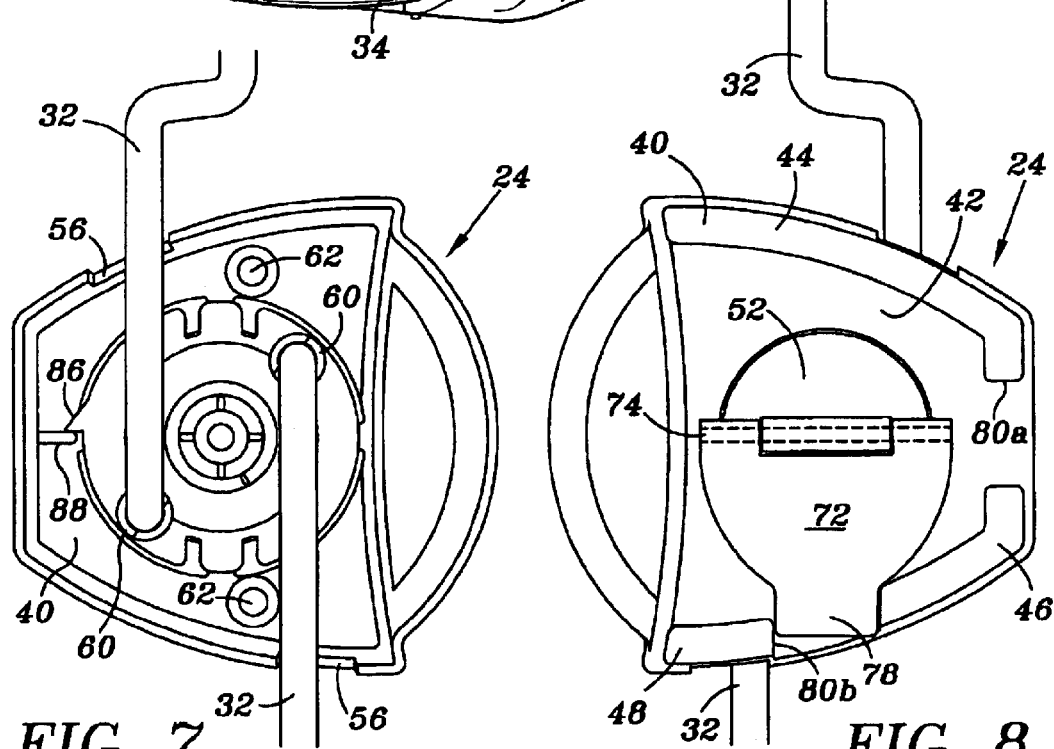

KENNEL DOOR LATCH

TECHNICAL FIELD OF THE INVENTION

The present invention relates to a latch for securing a door in a closed position. More particularly, the present invention relates to a latch for securing a kennel door, the latch having a knob movable between an extended position and a storage position.

BACKGROUND OF THE INVENTION

A wide variety of kennels have been used to transport animals for numerous years. These kennels generally include a housing unit, a door, and a latch for securing the door in the closed position. Various latches have been devised to secure kennel doors; however, most are difficult to operate and require awkward manipulation. Manipulation is further compounded in many designs because extremely small handles or knobs exist; therefore, pet owners are unable to obtain sufficient leverage to lock or unlock the door.

In addition, many of the prior latch designs include metal pins or other sharp protrusions extending outward from the latch. These pins and protrusions can often hook onto a pet's collar or an owners clothing and can also scratch the owner.

Finally, most kennels are bulky and require a large area of space when being are stored or shipped. As a result, present kennel designs use detachable components, including an upper hull and a lower hull. The upper and lower hulls can be connected to form an interior area to contain a pet or the hulls can be disconnected and configured in a nested position to reduce storage space. While in the nested position, the door and latch assembly are detached from the kennel and the lower hull is inverted so as to be nested inside the upper hull. A storage area is created between the nested hulls and is capable of storing the door and latch assembly. However, current latch configurations are too large to be placed inside the storage area. As a result, the door and latch assembly will oftentimes become misplaced since the door cannot be stored with the nested hulls.

There is a need for a latch that does not require awkward manipulation, a large force to operate and having a low profile so that a door can be stored between the kennel hull portions when the hulls are nested together.

SUMMARY OF THE INVENTION

The present invention relates to a latch for a door. The latch is movable between an open position and a closed position such that when the latch is in the closed position, the door is locked, and when the latch is in the open position, the door is unlocked and can freely rotate.

The latch preferably includes a base plate adapted to be mounted to the door and a housing secured to the base plate. A rotating member or bolt actuator is rotatably disposed between the base plate and the housing. At least one bolt is coupled to the rotating member and is slidable between a retracted position, where the door is unlocked, and an extended position, where the door is locked.

A knob is pivotally mounted to the rotating member and extends through the housing. The knob is movable between a folded position and an extended position. When the knob is in the extended position, the knob is positioned generally perpendicular to the housing so that the user can easily reciprocate the rotating member to move the bolt between the bolt retracted position and the bolt extended position without awkward manipulation. To place the knob in the folded position, the knob is pivoted so that the knob is recessed inside a housing recessed area when the rotating member is placed in the bolt extended position. The latch folds to eliminate any protrusions extending from the housing, is compact and prevents the bolt from moving between the retracted and open positions.

BRIEF DESCRIPTION OF THE DRAWINGS

For a more complete understanding of the invention and for further advantages thereof, reference is now made to the following Description of the Preferred Embodiments taken in conjunction with the accompanying Drawings in which:

FIG. 1 illustrates a front perspective view a kennel including the present latch in the extended position and mounted on a kennel door connected to the pet kennel;

FIG. 7 is a rear elevation view of the latch with bolts connected thereto in the retracted position;

FIG. 8 is a front elevation view of the latch knob folded in the stored position with the bolts in the retracted position;

DESCRIPTION OF THE PREFERRED EMBODIMENTS

Figure 2:
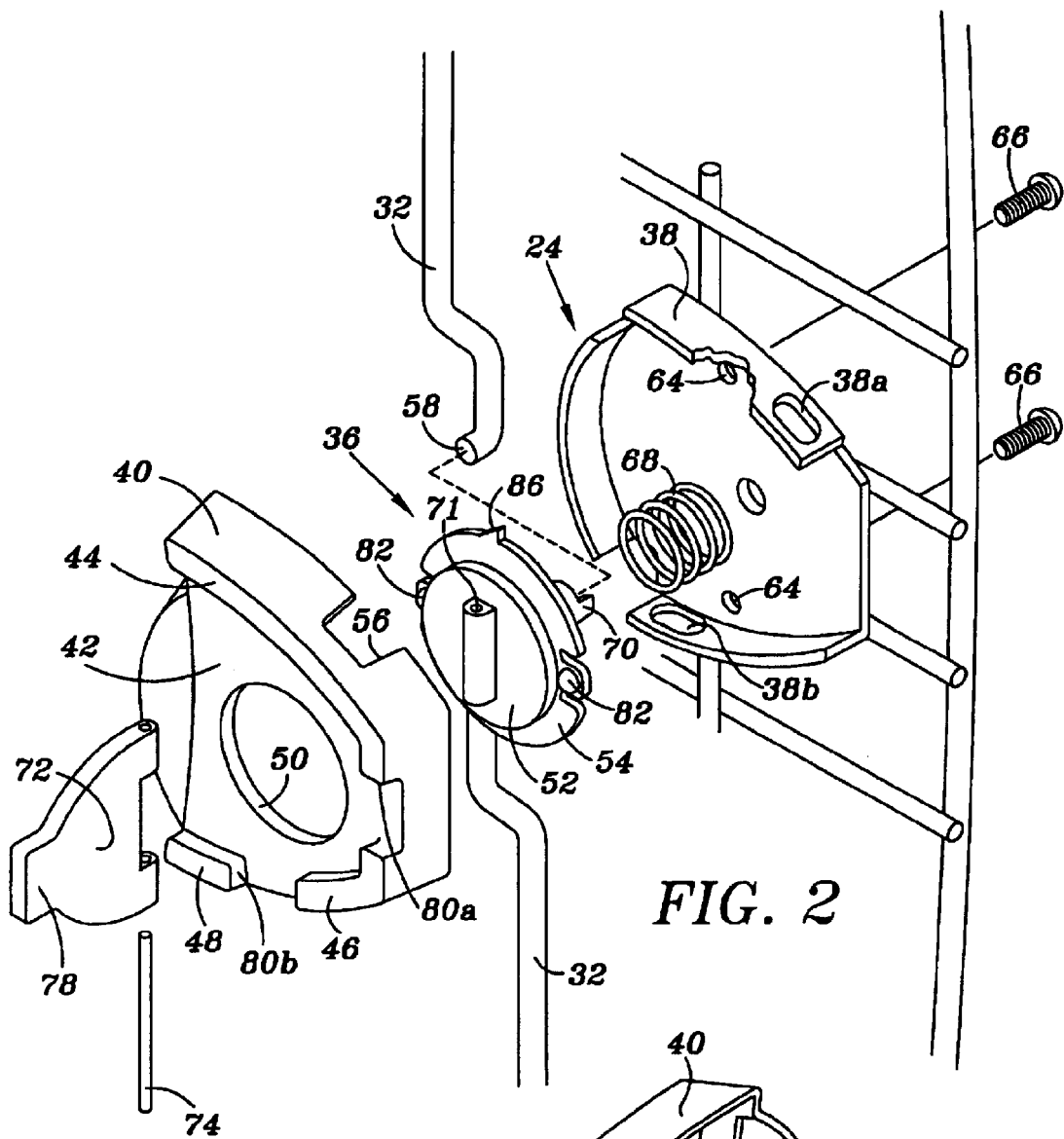
FIG. 2 is an exploded perspective view of the latch of FIG. 1.

As seen in FIG. 1, a kennel 20 includes a door 22 having a latch 24. Door 22 is pivotally disposed inside a door opening 26 by a hinge rod 28. Latch 24 serves to secure door 22 in the closed position so as to house a small pet inside kennel interior 30. At least one bolt 32 is secured to latch 24 so that latch 24 can selectively reciprocate bolts 32 into and out of engagement with apertures 34 to lock or unlock door 22.

As seen in FIG. 2, latch 24 includes a bolt actuator or rotating member 36, a base plate 38 and a housing 40. Housing 40 includes a recessed area 42 defined by walls 44, 46 and 48. An aperture 50 is disposed inside recessed area 42 and -is sized slightly smaller than the diameter of rotating member 36. Rotating member 36 includes a top surface 52 surrounded by a recessed periphery 54 such that during assembly the recessed periphery 54 opposes the diameter of aperture 50 and the top surface 52 is co-axially aligned with the aperture 50 such that surface 52 will be received within aperture 50.

Figure 3:
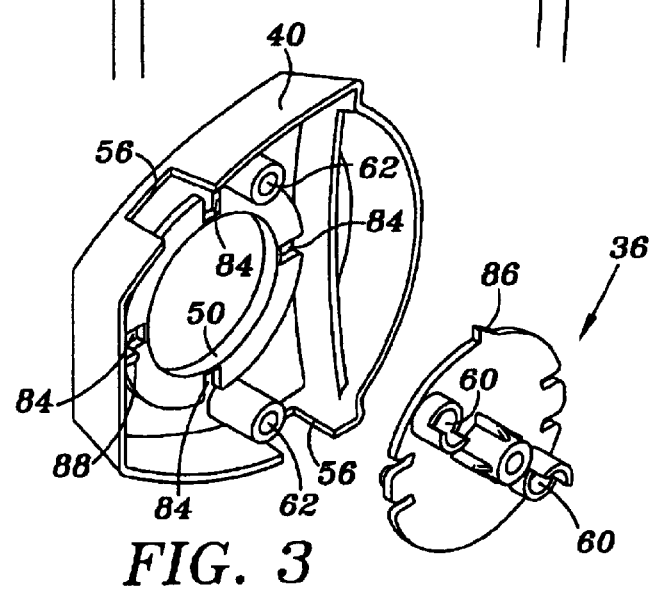
FIG. 3 is an exploded perspective view of the rotating member and housing interior portion.
Figure 4:
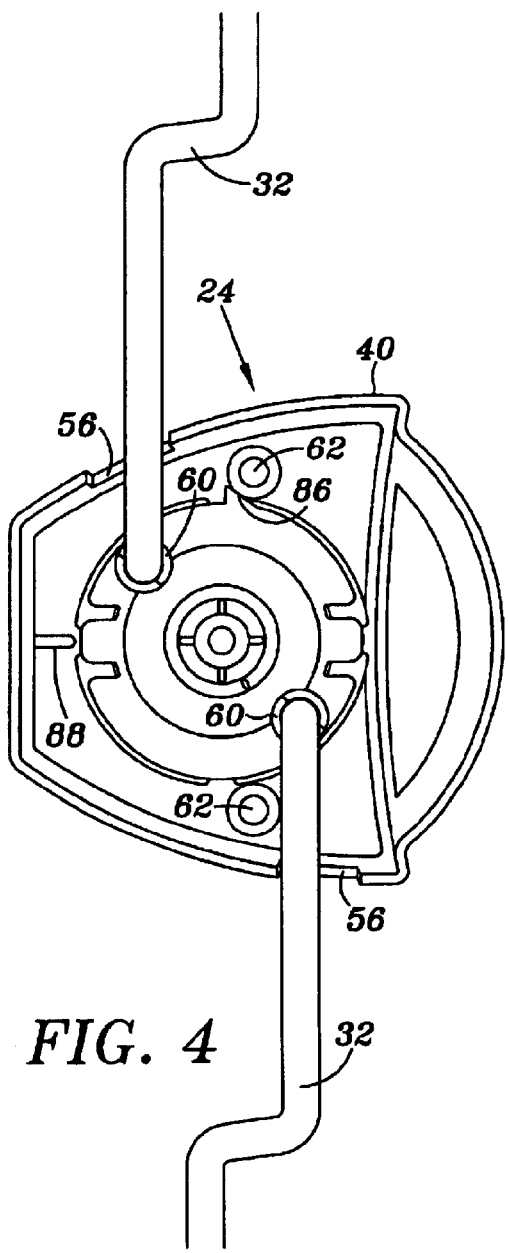
FIG. 4 is a rear elevation view of the latch with bolts connected thereto in the extended position.

Base plate 38 is securely fastened to door 22 by welding, soldering, gluing or the like. When assembling latch 24, rotating member 36 is connected to bolts 32 by placing bolts 32 through openings 38a and 38b on base plate 38 and through slots 56 in housing 40 (FIGS. 2–4). Upturned ends 58 are inserted inside apertures 60. Rotating member 36 is rotatably mounted between base plate 38 and housing 40 so that the rotating member 36 can rotate while disposed between the plate 38 and housing 40. Base plate 38, rotating member 36 and housing 40 are connected together by aligning threaded tubular receiver members 62 on housing 40 with base plate openings 64 such that mounting screws 66 can secure the members together. A coil spring 68 is optionally provided to co-axially mount on guide member 70. Coil spring 68 acts as a biasing member to urge rotating member 36 outwardly causing recessed periphery 54 to oppose and abut housing 40 adjacent aperture 50. It should be realized by one of ordinary skill that rotating member 36 can be rotatably mounted between door 22 and housing 40 so as to eliminate the need for base plate 38. In this configuration, housing 40 can be connected directly to door 22 by welding, soldering, gluing or the like.

Rotating member top surface 52 includes a bore 71 to receive a pin 74 so as to pivotally secure a knob 72 to rotating member 36. This configuration permits knob 72 to pivot between a folded position (FIGS. 5 and 8), where knob 72 is received inside recessed area 42, and an extended position, where knob 72 is pivoted outward from recessed area 42 to a position generally perpendicular to the housing 40 (FIGS. 1 and 6). While in the folded position, a knob extension 78 can be placed inside sidewall slot 80a and 80b. Sidewall slots 80a and 80b serve to secure knob 72 in the folded position while also providing an accessway to allow the user to easily grasp extension 78 to pivot knob 72 to the extended position. While in the extended position, knob 72 is used to turn rotating member 36 to selectively reciprocate bolts 32 into and out of engagement with apertures 34 between a retracted open position (FIGS. 7 and 8) and an extended locked position (FIGS. 1, 4 and 5).

As seen in FIGS. 2 and 3, recessed periphery 54 of rotating member 36 is provided with two detent protrusions 82 spaced apart at 180-degree intervals. Housing 40 is provided with four detent recesses 84, spaced apart at 90-degree intervals, so that rotating member 36 can be temporarily restrained from rotational movement relative to housing 40.

Figure 5:
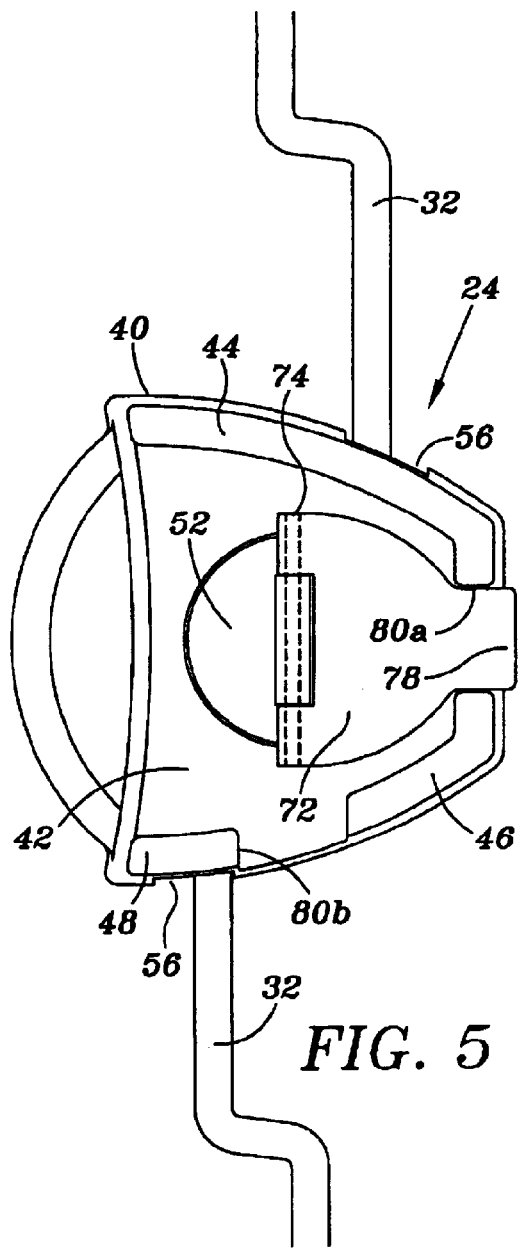
FIG. 5 is a front elevation view of the latch knob folded in the stored position with the bolts attached thereto in the extended position.
Figure 6:
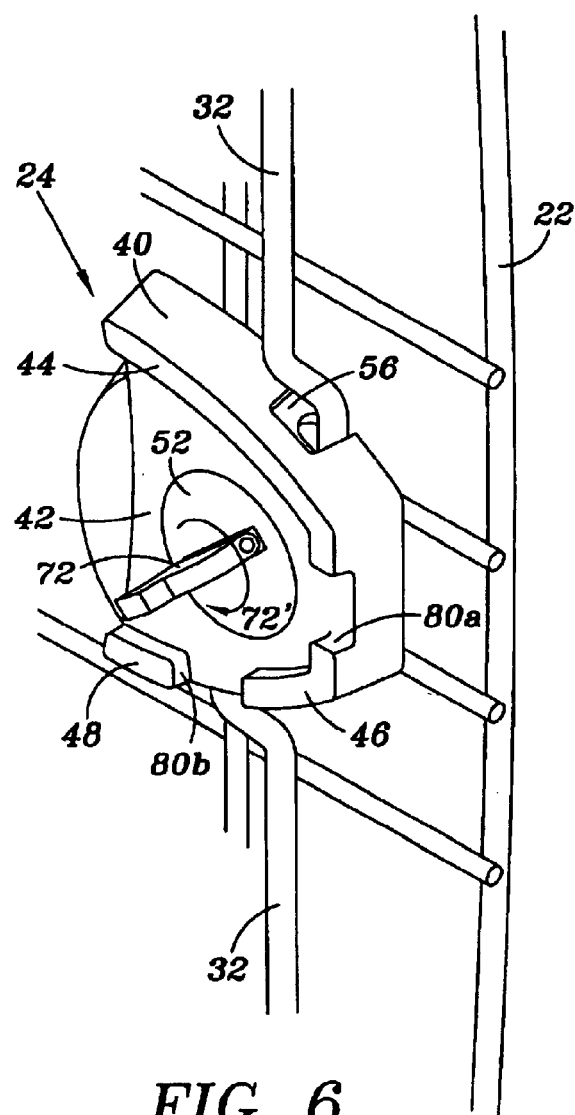
FIG. 6 is a front perspective view of the latch knob unfolded in the use position.

Referring specifically to FIGS. 1, 4 and 5, latch 36 can be seen with bolts 32 extended in apertures 34 and knob 72 in the folded position. To reciprocate bolts 32 out of engagement with apertures 34, knob 72 is pivotally removed from recessed area 42. Once knob 72 is pivoted and disposed in a generally perpendicular relationship to housing 40 (FIG. 1), a rotational force can be applied to knob 72 in the direction of arrow 72' (FIG. 1 and 6). This force turns rotating member 36 thereby retracting bolts 32 from apertures 34 to open door 22. The rotational force applied to knob 72 removes detent protrusions 82 from detent recesses 84 allowing rotating member 36 to turn. Rotating member 36 will continue to turn until for approximately 90 degrees until detent protrusions 82 engage detent recesses 84 at the limits of travel of rotating member 36 (FIG. 7). In this position, rotating member 36 is temporarily restrained against inadvertent rotational movement in the unlocked position. As seen specifically in FIG. 3, rotating member 36 is further restricted from movement by a rib 86 and stop member 88. Stop member 88 is formed on cover 40 such that as rotating member 36 is turned, rib 86 engages stop member 88 to prevent further movement of the rotating member. Knob 72 can then be placed in the folded position such that the knob 72 is received by recessed area 42 and extension 78 is placed inside slot 80b (FIG. 8). While in the unlocked position, bolts 32 remain retracted so as to prevent the ends of the bolts from injuring a pet or a person.

Figure 9:
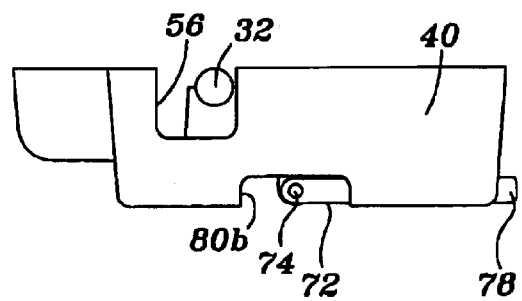
FIG. 9 is a bottom plan view of the present latch.
Figure 10:
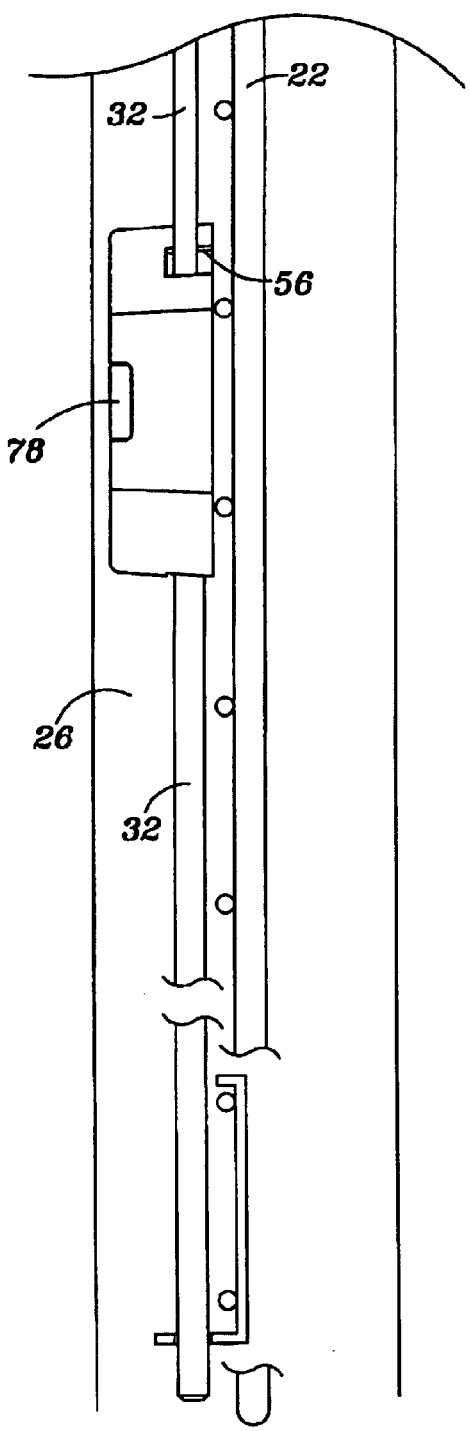
FIG. 10 is a side elevation view of the latch with the latch knob in the folded position.

Because knob 72 is pivotally mounted on latch 36, the latch is compact and maintains a low profile, as best seen in FIGS. 9 and 10. This reduces any injuries to animals or humans as a result of handles protruding outward from latch 36. Futhermore, because many kennel models when not being used are disassembled and nested together to reduced storage space, door 22 and latch 36 can be stored between the nested upper and lower hulls. This storage configuration is difficult with current latch designs as they are not compact and do not maintain a low profile.

Other alterations and modifications of the present invention will likewise become apparent to those of ordinary skill in the art upon reading the present disclosure. It is intended that the scope of the invention disclosed herein be limited only by the broadest interpretation of the appended claims to which the inventors are legally entitled.

What is claimed is:

1. A latch for a door moveable between an open position and a closed position, the latch securing the door in the closed position, the latch comprising:

a housing adapted to be mounted to the door, said housing including a recessed area and a detent recess;

a bolt mounted to said housing and moveable between a bolt retracted position in the door open position and a bolt extended position in the door closed position;

a bolt actuator mounted within said housing and coupled to said bolt and said bolt actuator including a detent; and a knob extending from said housing and coupled to said bolt actuator, said knob being moveable between a storage position within said housing recessed area and an extended position for moving said bolt between said bolt retracted position and said bolt extended position.

2. The latch of claim 1 wherein said knob is disposed generally parallel to said housing in said storage position.

3. The latch of claim 1 wherein said knob is disposed generally perpendicular to said housing in said extended position.

4. The latch of claim 1 wherein said knob is pivotably mounted to said bolt actuator.

5. The latch of claim 1 wherein said knob includes an extension and said housing recessed area includes a slot for receiving said knob extension in said knob storage position.

6. A latch for a door moveable between an open position and a closed position, the latch securing the door in the closed position, the latch comprising:

a base plate adapted to be mounted to the door;

a housing secured to said base plate, said housing including a recessed area and a detent recess;

a rotating member disposed between said housing and said base plate and said rotating member including a detent;

a knob pivotably mounted to said rotating member and extending through said housing;

a bolt coupled to said rotating member and slidable between a retracted position in the door open position and an extended position in the door closed position; and wherein when said knob is in said folded position, said knob is received within said recessed area of said housing and when said knob is in said extended position, said knob extends from said recessed area and is operable to rotate said rotating member so as to slide said bolt between said retracted and extended positions.

7. The latch of claim 6 wherein said rotating member includes a rib and said housing including a stop member, such that when said rib engages said stop member further rotation of said rotating member is prevented.

8. A latch for securing a door in a closed position and opening the door in a door open position, the latch comprising:

a housing adapted to be mounted to the door, said housing having an aperture and a detent recess;

a rotating member mounted to said housing, said rotating member being disposed between said housing and the door, and said rotating member including a detent;

a bolt mounted to said rotating member and moveable between a retracted position in the door open position and an extended position in the door closed position; and, said rotating member including a pivotally mounted knob extending through said housing aperture and operable between a folded position and an extended position, wherein in said knob folded position, said knob is generally parallel to said housing and when said knob is in said extended position, said knob is generally perpendicular to said housing, such that said knob can reciprocate said rotating member to move said bolt between said retracted and extended positions.

\* \* \* \* \*